United States Patent [19]

Hays et al.

[11] 4,235,361

[45] Nov. 25, 1980

[54] PROCESS FOR PRODUCING A PRESSURE VESSEL HEAD OR SHELL

[75] Inventors: George Hays, St. Louis; Edward J. Clarkin, Florissant, both of Mo.

[73] Assignee: Nooter Corporation, St. Louis, Mo.

[21] Appl. No.: 40,596

[22] Filed: May 18, 1979

[51] Int. Cl.[3] .............................................. B23K 31/02

[52] U.S. Cl. ............................ 228/173 A; 228/173 C; 228/184; 228/212; 29/421 R; 29/446

[58] Field of Search ............. 29/421 R, 446; 228/175, 228/184, 173 C, 212, 173 A

[56] References Cited

U.S. PATENT DOCUMENTS

| | | | |
|---|---|---|---|
| 2,799,318 | 7/1957 | Blucher et al. | 29/421 X |
| 3,116,548 | 1/1964 | Andrus | 29/421 X |
| 3,293,739 | 12/1966 | Hoglund et al. | 228/173 C X |
| 3,423,820 | 1/1969 | Pechacek et al. | 228/184 |
| 3,904,101 | 9/1975 | Beltran et al. | 228/173 A |
| 3,980,220 | 9/1976 | Wolfe et al. | 228/184 X |

*Primary Examiner*—Kenneth J. Ramsey
*Attorney, Agent, or Firm*—Gravely, Lieder & Woodruff

[57] ABSTRACT

A layer head or shell for a pressure vessel is formed by building up successive wraps over a liner, each wrap consisting of a plurality of segments which fit together such that the wrap completely covers the liner or the wrap immediately under it. Each segment is curved to conform to the surface over which it is installed, and once in place a seal is provided along its periphery. Air is evacuated from the space between the wrap segment and the underlying surface so that air at atmospheric pressure will force the wrap segment down tightly against the underlying surface. During this time tack welds are made along the periphery of the wrap segment to join it to the underlying layer. Then the vacuum is released and a final or continuous weld is made along the periphery. As the weld cools it places the underlying layers in a state of precompression.

16 Claims, 7 Drawing Figures

FIG. 5
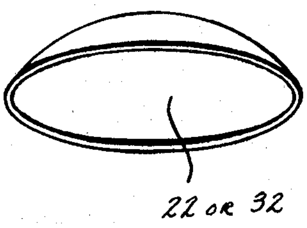
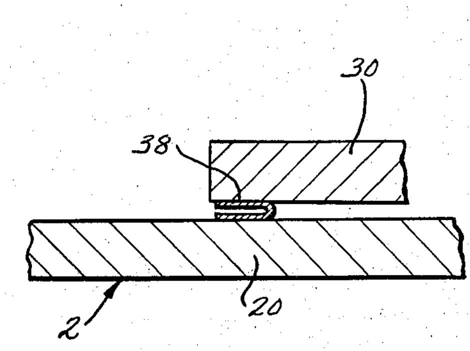
FIG. 7
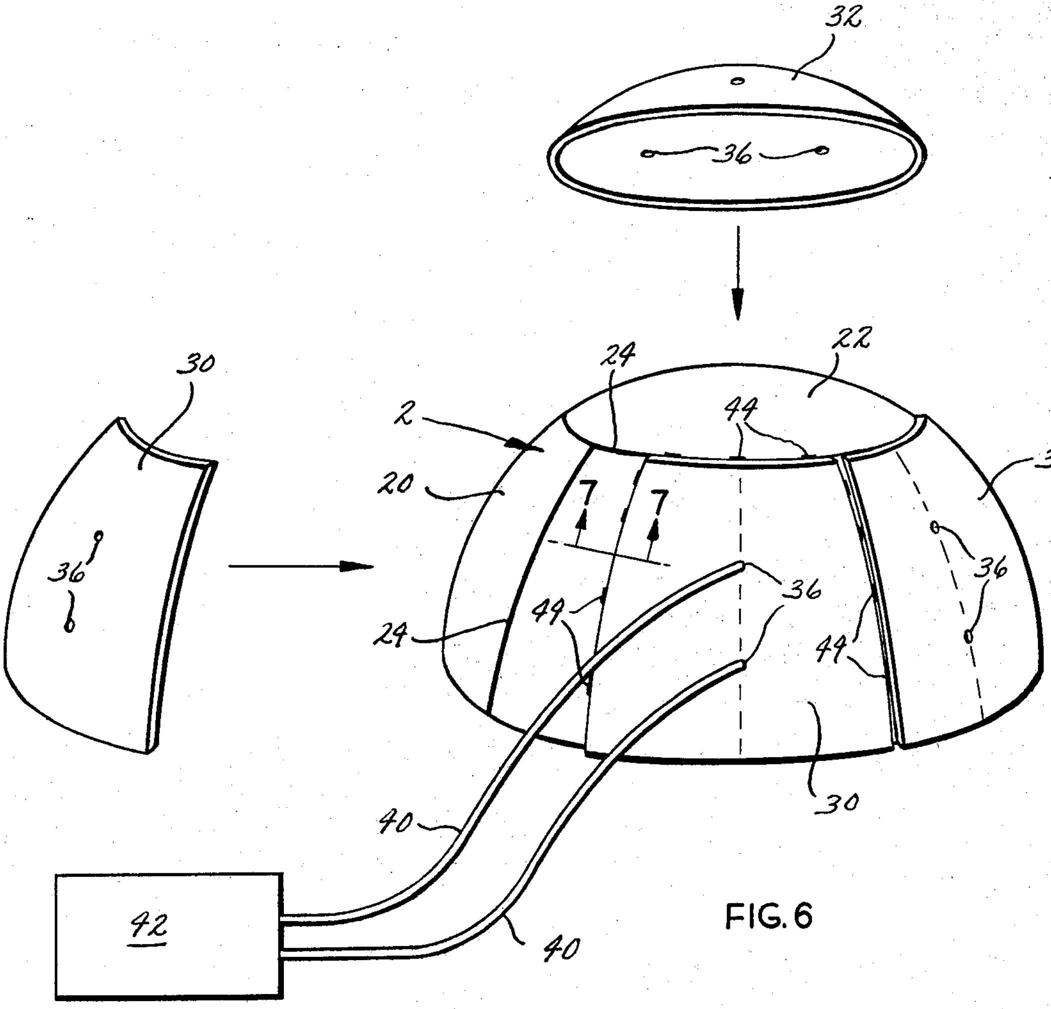
FIG. 6

PROCESS FOR PRODUCING A PRESSURE VESSEL HEAD OR SHELL

BACKGROUND OF THE INVENTION

This invention relates in general to pressure vessels and, more particularly, to process for fabricating layered heads and shells for pressure vessels.

The typical pressure vessel has a cylindrical shell and heads that close the two ends of the shell. The shell and heads are manufactured as separate components and are thereafter joined together by welding to produce a unitary structure. To enable the heads to better withstand elevated pressures, they are usually somewhat dish-shaped, having their concave surfaces presented inwardly toward the interior of the vessel. Indeed, in many vessels, particularly those designed to withstand high pressures, the heads are hemispherical.

It is generally recognized that pressure vessel walls composed of multiple layers are superior to thick single walls in many respects. For example, the individual plates of a layered wall, generally speaking, have better metallurgical properties than thick single walls since they are subjected to greater rolling at the mill. As a consequence, a layered vessel is usually safer than a solid wall vessel of equivalent wall thickness. Similarly, because of their better metallurgical properties, the individual layers of layered walls do not tend to laminate as often occurs with solid walls. Also, in layered vessels it is possible to vary the metal alloy from layer to layer, thus enabling an expensive corrosion resistant liner to be used with less expensive, yet stronger, surrounding layers. While a variety of thick steel plate clad with various corrosion resistant alloys is available from steel mills, such plate is expensive. Moreover, thin layers are relatively easy to shape, but this is not the case with the heavy steel plate used in solid wall vessels. Thus, layered walls can be manufactured in greater thicknesses than solid walls. Aside from that, the individual layers that comprise the walls of a layered vessel, upon being welded together, tend to shrink as the welds which join them solidify and cool, thereby placing the vessel walls in a state of precompression. This is desirable since the elevated pressures within the vessel create tensile forces in the vessel walls. In contrast, solid wall vessels are normally heat treated to relieve them of stress concentrations, and therefore do not exist in a state of precompression.

Heretofore different procedures have been developed for fabricating cylindrical shells from multiple layers, one highly successful procedure being set forth in U.S. Pat. No. 3,478,784. Heads, by reason of their compound curvatures, are not so easily fabricated in multiple layers, and as a consequence most heads are still of solid wall construction. Thus, to a large measure, the pressures to which present pressure vessels may be raised are limited by the heads at their ends.

One of the major problems encountered in the fabrication of both layered heads and shells is that of obtaining metal-to-metal contact between adjacent layers so that the overlying layer effectively reinforces the underlying layer. Without this type of contact the underlying layer is often stressed significantly before the overlying layer effectively backs it and assumes some of the load imposed by the pressurized contents of the vessel. Unless metal-to-metal contact exists between adjacent layers, the so-called loose liner problem is repeated at every interface at which such contact is lacking.

SUMMARY OF THE INVENTION

One of the principal objects of the present invention is to provide a process for fabricating pressure vessel components having multiple layers which are in metal-to-metal contact with each other. Another object is to provide a process of the type stated in which the each succeeding layer exerts a compressive force on the layers which underlie it so that the underlying layers are in a state of precompression. A further object is to provide a process of the type stated in which successive layers are installed, one upon the other, such that they are in metal-to-metal contact at their interfaces. An additional object is to provide a process of the type stated which is relatively simple and inexpensive to perform. Still another object is to provide a process of the type stated which is ideally suited for fabricating layered heads that are dome-shaped. These and other objects and advantages will become apparent hereinafter.

The present invention is embodied in a process wherein a wrap segment is placed against an underlying layer, the pressure is reduced in the area between the segment and the underlying layer, and welds are made between the segment and underlying layer along the periphery of the segment. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur—

FIG. 5 is a perspective view of a cap for the liner or a wrap;

FIG. 6 is an exploded perspective view illustrating the installation of the first wrap over the liner; and FIG. 7 is a fragmentary sectional view taken along line 7—7 of FIG. 6 and showing an adhesive-backed tape which is doubled back upon itself to form a seal along the edge of one of the gores (the space between the gore and underlying layer is enlarged as is the thickness of the tape, all to better illustrate the function of the tape).

DETAILED DESCRIPTION

Figure 1:
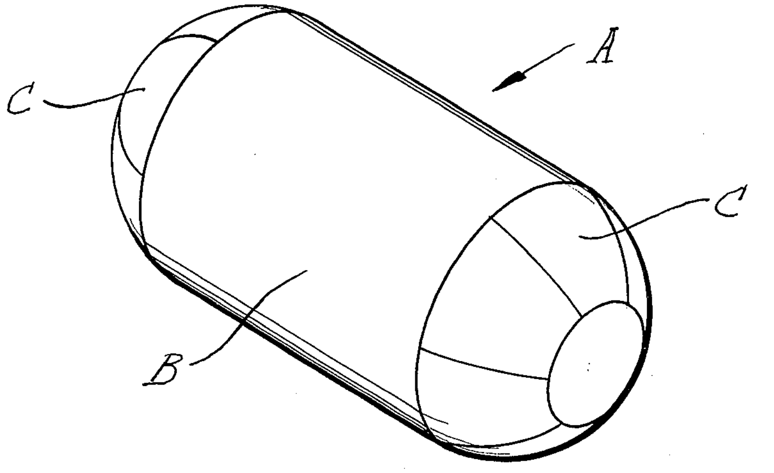
FIG. 1 is a perspective view of a pressure vessel provided with heads constructed in accordance with the present invention.

Referring now to the drawings (FIG. 1), A designates a pressure vessel composed of three major components, namely a cylindrical shell B and heads C at each end of the shell B. The heads C close the ends of the shell B and to better withstand elevated pressures within the vessel, they are generally dome-shaped, or at least in some configuration that extends outwardly from the end of the shell B and generally converges toward the centerline of the shell B. Typical configurations for the heads C are hemispheres, ellipsoids, and cones, to name a few.

The process of the invention may be used to fabricate the shell B and the heads C or any one of them. For example a layered head C may be installed on a solid wall shell, or vice-versa, or the shell B and heads C may all be layered. Irrespective of whether the component is a shell or a head, where it is fabricated in multiple layers, the innermost layer is considered a liner. This is the layer which is exposed to the contents of the vessel B, and it should, of course, resist attack by the contents of the vessel A. Basically, as to each component, the liner is fabricated or otherwise formed in its entirety. Then the various wraps are installed over the liner, so as to build up a succession of wraps. Each wrap is composed of a plurality of segments that fit together so that the wrap completely covers the layer beneath it, whether that layer be the liner or another wrap. Nevertheless, the segments are installed individually over the underlying layer. Each segment of course conforms in contour to the surface over which it fits, and to insure metal-to-metal contact, the edges of the wrap are sealed to the underlying layer and then air is evacuated from the space between the wrap and the underlying surface. While the vacuum is maintained, several tack welds are made along the periphery of the wrap to temporarily join it to the underlying layer. Then the vacuum is released and a complete weld is made along the periphery.

The process is perhaps best described as it applies to the fabrication of a head C of hemispherical configuration. The head C includes a liner 2 (FIG. 2) that is presented inwardly toward the interior of the vessel A and a plurality of successive wraps 4, 6, and 8 that overlie the liner 2. Since the liner 2 is exposed to the contents of the vessel, it should be fabricated from a metal that is inert to those contents, or at least it should be clad with a substance that is not attacked by the contents. The strength of the head C is determined to a large measure by the thickness of the individual wraps 4, 6, and 8 and the number of them, and while these factors may be important insofar as an individual application is concerned, they are not critical as to the principles of the invention. Therefore only the three wraps 4, 6, and 8 are illustrated and described, it being understood that more or less wraps may be present to vary the strength of the head C. The wraps 4, 6 and 8 are arranged in that order from the liner 2, and accordingly the wrap 4 is immediately next to the liner 2, while the wrap 8 is exposed outwardly. The liner 2 and the wraps 4, 6, and 8 have circular ends 10, along which they are welded to the end of the shell B.

The liner 2, like the head C itself, is hemispherical in configuration. It must resist attack by the contents of the vessel A and to this end it should be fabricated from a metal having that capability or should at least be clad with such a metal. In all but extremely small sizes, it is convenient to fabricate the liner 2 from several gores 20 (FIG. 4) and a dished cap 22 (FIG. 5), all of which are joined together in a hemispherical shape by welds 24. The gores 20 and cap 22 constitute segments of the final shape, that is the liner 2.

Figure 3:
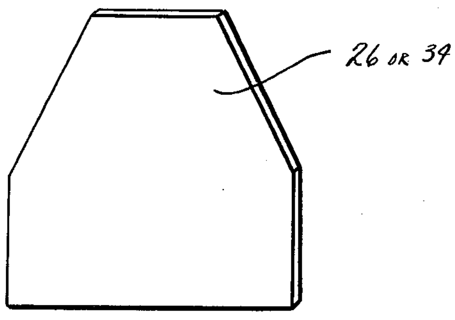
FIG. 3 is an elevational view of a flat cut plate from which a gore of the liner or of one of the wraps is formed.
Figure 4:
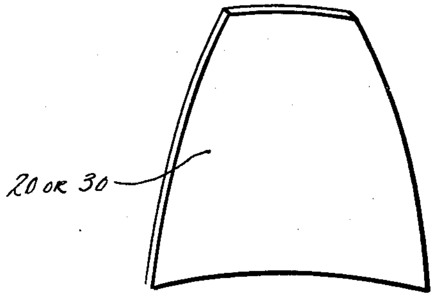
FIG. 4 is a perspective view of a gore for the liner or a wrap.

To provide a gore 20, the outline of a rough gore is laid out in the flat on flat steel plate, of the desired thickness. Then the plate is cut along the outline by shearing or flame cutting procedures to provide a cut plate 26 (FIG. 3). Next the cut plate 26 is deformed into the desired contour in a dishing operation. Dishing involves nothing more than subjecting the plate 26 to repeated impacts of a male die mounted on a mechanically or hydraulically operated ram while supporting the plate 26 on a female die. After the plate 26 is dished to the proper contour, the configuration of the actual gore 20 is laid out upon it. In this regard, gage may itself have the peripheral configuration of the gore 20, in which case it may be used as a template for laying out the gore 20 upon the dished plate 26. The plate 26 is then trimmed along the marking to provide the gore 20 (FIG. 4). This trimming may be achieved by flame cutting, by machining, by air arcing, or by friction sawing.

The cap 22 (FIG. 5) is also derived from a flat plate of thickness equal to that of the plate 26 from which the gores 20 are formed. This plate is cut to its finished size and then is dished to the desired contour, a template of proper radius being used to check the formed contour.

Figure 2:
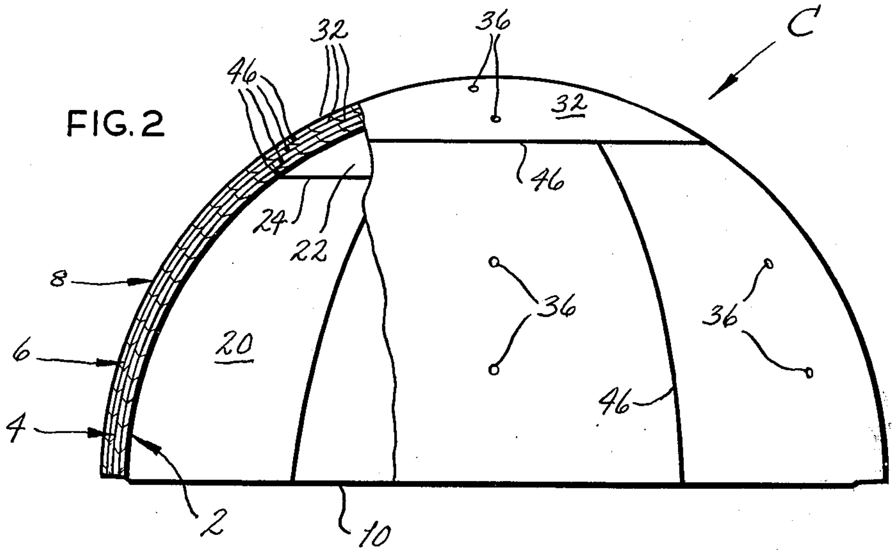
FIG. 2 is an elevational view of one of the heads partially broken away and in section.

Once the gores 20 and cap 22 are formed to their proper configuration, the gores 20 are fitted together along their sides and then joined by welding to produce the welds 24 (FIGS. 2 & 6). The cap 22 is then placed over the configuration that is so formed and it is likewise secured in place by welding to produce the additional welds 24. Next, the welds 24 are ground flush, at least with respect to the outwardly presented surfaces of the gores 20 and cap 22.

If the head C is small enough, it may be possible to produce the liner 2 from a single plate using a press, a spinning machine, a flanging machine, or a combination of the foregoing, to deform the plate into the hemispherical or other desired configuration.

The several wraps 4, 6 and 8 are all segmented and are welded to the underlying layer, whether that layer be the liner 2 or one of the wraps 4 or 6. Considering first the wrap 4, it includes gores 30 (FIG. 4) and a cap 32 (FIG. 5) which are fitted together into a hemispherical shape. The gores 30 and cap 32 are derived from flat plate of the desired thickness. The metal of the plate for the wrap 4 is selected primarily for its strength, with little or no consideration given to its ability to resist attack by the contents of the vessel A, since the liner 2 isolates the wrap 4 from the interior of the vessel A. Carbon steel or a low alloy, high strength, steel are ideally suited for the plates from which the gores 30 and cap 32 are formed.

To provide the gores 30, a rough gore is laid out on flat steel plate which is then cut along the marked layout to provide a cut plate 24 (FIG. 3). This plate is dished to the proper contour in a conventional dishing operation, the contour being confirmed with a cradle template. More specifically, the cut plate must in the dishing operation be configured such that its inwardly presented surface corresponds as closely as possible to the outwardly presented surface of the liner 2, at least at the location where the plate 34, or more accurately the gore 30 which is derived from it, is to overlie the liner 2. Once the plate 34 has acquired the desired contour, the outline of the gore 30 is laid out upon it, and this outline may be derived from the cradle template, provided the template is shaped the same as the gore 30. The dished plate 34 is trimmed along that outline to provide the gore 30 (FIG. 4).

In order to form the cap 32, its outline is laid out on flat plate which is then finish cut along that outline. Thereafter, the cut plate is dished to the desired configuration, thus providing the finished cap 32 (FIG. 5).

Whereas the gores 20 and cap 22 of the liner 2 are impervious and thus free of all voids, apertures, and the like, the gores 30 and cap 32 of the wrap 4 have holes 36 (FIG. 6) which extend completely through them, and are furthermore tapped. Moreover, as previously mentioned, it is not essential that the gores 30 and cap 32 resist attack by the contents of the vessel since they are not exposed to those contents as are the gores 20 and cap 22 of the liner 2. Hence, the gores 30 and cap 32 are most likely formed from a metal different from that of the gores 20 and cap 22.

The gores 30 are installed one at a time on the liner 2 (FIG. 6), and once all the gores 30 are fully secured in place, the cap 32 is installed to complete the first wrap 4. To install one of the gores 30, the surface of the liner 2 over which it is to be placed is first inspected to insure that it is free of all dirt or granular matter, and so is the inside surface of the gore 30. If necessary those surfaces are cleaned to remove loose scale and rust. Then the gore 30 is placed over the outwardly presented surface of the liner 2, preferably such that its side edges are offset from the welds 24 that join adjacent gores 20 of the liner 2 together along their side edges. Slight adjustments in the contour of the gore 30 may be made at this time by either more dishing or some flattening to insure that the inside surface of the gore 30 conforms to the outside surface of the liner 2. In most cases, the lower edge of the gore 30 will align with the lower edge of the liner 2, that is the edge at the circular open end 10.

Also, along the entire periphery of the gore 30 and the underlying surface of the liner 2, a seal 38 is provided. This seal is such that whatever space exists between the inwardly presented surface of the gore 30 and the outwardly presented surface of the liner 2 is completely isolated from the surrounding atmosphere, save for the tapped holes 36 in the gore 30. The seal 38 may take the form of a mastic between the inwardly presented face of the gore 30 and the outwardly presented surface of the liner 2, or the mastic may be along the peripheral edge of the gore 30 and the outwardly presented surface of the liner 2. The seal 36 may also be an adhesive-backed tape. This tape may lap over the peripheral edge of the gore 30 and adhere to both that edge and the back face of the liner 2, but better results are derived when the tape is doubled back upon itself with its adhesive surfaces presented away from each other and its fold directed inwardly toward the center of the gore 30. One of the surfaces adheres to the inside surface of the gore 30 immediately inwardly from the edge of the gore 30, while the other adheres to the outside surface of the liner 2 when the gore 30 is placed over the liner 2 (FIG. 7).

Whatever its nature, the seal 38 should be compatible with conventional welding procedures in the sense that a weld can be made along it or through it. In other words, the seal 36 should not contaminate a weld that is made along it or through it. Of all the many materials tested, crepe paper tape, such as conventional drafting tape, has proved to be the best.

Once the tape or other seal 38 is in place and secure, a vacuum line 40 (FIG. 6) is connected to each of the tapped holes 36 in the gore 30, and this line leads to a vacuum device 42, such as an aspirator or a vacuum pump. When energized, the vacuum device 42 evacuates air from whatever space that exists between the gore 30 and liner 2, thereby permitting the surrounding air, which is at normal atmospheric pressure, to force the gore 30 tightly down against the liner 2. In effect, metal-to-metal contact is achieved between the inwardly presented surface of the gore 30 and the underlying outwardly presented surface of the liner 2. Acceptable results are obtained with relatively low vacuums on the order of 25 mm Hg.

While the vacuum is maintained, tack welds 44 (FIG. 6) are made along the periphery of gore 30 to temporarily secure the gore 30 to the liner 20. These tack welds should be interspersed around the gore 30 to attain a final spacing of about three to six inches. Where a doubled back tape is the seal 38 (FIG. 7), the tack welds 44 are made outwardly from the tape, in which case the tape and the barrier which it forms are not disrupted. This prevents the molted weld metal from flowing toward the low pressure area that is isolated by the tape seal 38. The vacuum device 42 remains energized as the tack welds 44 are made so as to remove any air that does seep into the space between the gore 30 and liner 2 in the event that the seal 38 is disturbed. On the other hand, where the tape seal 38 overlaps the edge of the gore 30, the tack welds 44 are made through the tape and more tape must be placed over each tack weld 44, to maintain a suitable vacuum.

After all of the tack welds 44 are completed, the vacuum device 42 is shut off and its vacuum lines 40 are disconnected from the tapped holes 36 of the gore 30. Also that much of the seal 38 which is accessible, if any, is removed. Then a final weld 46 (FIG. 2) is made along the two side edges and the shorter end edge of the gore 30, thereby joining the gore 30 securely to the underlining liner 2. As the final weld 46 solidifies and cools, it shrinks, and this has the effect of compressing the portion of the liner 2 immediately beneath it.

The remaining gores 30 of the first wrap 4 are installed on the liner 2 in the same manner but with a slight gap on the order of ⅜ to ¾ inches between the side edges of adjacent gores 30. Where a weld 46 is between the side edges of two adjacent gores 30, the weld 46 not only penetrates the liner 2 and the edge of the gore 30 which is being secured, but also completely fills the gap between the adjacent side edges.

Once all the gores 30 are in place, the cap 32 of the wrap 4 is placed over the cap 32 of the liner 2 and is secured to the liner 2 in the same manner as the gores 30. Again, the cap 32 is small enough to provide a slight gap between its edge and the end edges of the gores 30. The final weld 46 that extends around the periphery of the cap 32 has sufficient weld metal to completely fill the gap between the end edges of the gores 30 and the peripheral edge of the cap 32.

Thereafter, all of the welds 46 along the gores 30 and cap 32 of the first wrap 4 are ground off flush with the outwardly presented surfaces of the gores 30 and cap 32. The tapped holes 36 remain open so that the outer surface of the liner 2 is exposed through them. In effect, the tapped holes 36 serve as weep holes. This completes the first wrap 4.

The second wrap 6 is installed over the first wrap 4 by the same procedure that the first wrap 4 was installed over the liner 2. Also the final welds 46 of the second wrap 6 are ground flush and the tapped holes 36 remain open. However, the welds 46 of the second wrap 6 are preferably offset from the welds 4 of the first wrap 4, at least insofar as the welds 46 along the sides and short ends of the gores 30 are concerned.

The third wrap 8 is installed over the second wrap 6 in the same manner, again with the welds 46 along the sides and short ends of its gores 30 offset from the corresponding welds 46 in the underlying wrap 6. However, since the wrap 8 is the final wrap, no need exists for grinding its welds 46 flush. The tapped holes 36 of the wrap 8 are likewise open. Indeed, the tapped holes 36 of the three wraps 4, 6 and 8 create a series of weep holes through the wraps 4, 6, and 8, and are useful in detecting defects in the liner 2. Should a small leak develop in the liner 2, the pressurized contents of the vessel A will escape through that leak and will migrate through holes 36 and along the interfaces between the wraps 4, 6 and 8 to appear at one of the holes 36 in the outer wrap 8 where the contents may be observed.

The foregoing process may be used to fabricate heads of different configurations, such as, ellipsoidal, conical, and torispherical. Also the heads may be provided with various appendages such as knuckles, inspection ports, flues and the like. In addition the process may be used in fabricating the shell B. However, since the various segments which make up the wraps of a shell are not dished, but instead are merely rolled into a cylindrical configuration, they may be held in place for welding by other suitable means such as circumferential bands. Even so, where large field fabrications are required, the present process provides many advantages over circumferential bands.

The segments that comprise the three wraps 4, 6 and 8 need not necessarily be the particular configurations that are illustrated for the gores 30 and caps 32. For example, the gores 30 may extend all the way to the axial center of the head C, in which case they will have a more triangular configuration. Indeed, they may not even be gores at all.

This invention is intended to cover all changes and modifications of the example of the invention herein chosen for purposes of the disclosure which do not constitute departures from the spirit and scope of the invention.

What is claimed is:

1. A process for fabricating a layered pressure vessel component such as a head or a shell, said process comprising: providing a first layer that is curved, placing a plurality of segments against the first layer with the segments being curved to conform to the contour of the first layer and having their edges adjacent to each other; as to each segment, reducing the pressure between that segment and the first layer so that air at atmospheric pressure will force the segment tightly against the first layer; and while the segment is forced tightly against the first layer, welding the segment at its periphery to the first layer.

2. The process according to claim 1 wherein the step of welding the segment includes tack welding the segment at a plurality of locations along its periphery.

3. The process according to claim 2 and further comprising allowing the pressure between the plates to revert to ambient pressure after the tack welds have been made; and thereafter making a continuous weld along the periphery of the segment.

4. The process according to claim 1 and further comprising establishing a seal between the segment and the first layer along the periphery of the segment, all prior to reducing the pressure between the segment and the first layer.

5. The process according to claim 4 wherein the step of establishing a seal includes placing an adhesive-backed tape along the periphery of the segment such that the tape adheres to the first layer and to the segment and bridges whatever gap may exist between them.

6. The process according to claim 5 wherein the tape is doubled back upon itself and adheres to the inside face of the segment and the outside surface of the first layer.

7. The process according to claim 4 wherein the step of reducing the pressure between the segment and first layer includes evacuating air through a hole in the segment, the hole extending completely through the segment and communicating with the area between the segment and the first layer.

8. The process according to claim 1 wherein the segments include gores which are dished and fit together side-by-side.

9. The process according to claim 8 wherein the segments further include a cap which is dished and has its periphery located along the ends of the gores.

10. The process according to claim 1 wherein the first layer comprises a multitude of segments that are welded together and the segments that are placed against the first layer have at least some of their edges offset from the welds of the first layer so that at least some of the welds that attach the segments to the first layer are offset from welds of the first layer.

11. The process according to claim 1 wherein the plurality of segments form a second layer over the first layer, and further comprising placing additional segments against the segments of second layer, the additional segments being curved to conform to the contour of the second layer and having their edges adjacent to each other, as to each additional segment, reducing the pressure between that segment and the second layer so that air at atmosphere pressure will force each additional segment tightly against the second layer, and while each additional segment is forced tightly against the second layer welding the additional segment along its periphery to the second layer.

12. A process for fabricating a layered pressure vessel component such as a head or shell, said process comprising: providing a liner having a generally convex outwardly presented surface; placing a plurality of wrap segments against the convex outwardly presented surface of the liner with each segment being curved to conform to the contour of the portion of the liner that it overlies, the plurality of wrap segments having their edges adjacent to each other and covering substantially the entire outwardly presented surface of the liner; as to each wrap segment forming a seal between it and the underlying surface of the liner with the seal being along the periphery of the segment; evacuating air from the space between the segment and the liner so that air at atmospheric pressure forces the segment tightly against the liner; and while the air is evacuated welding the segment to the liner along the periphery of the segment.

13. The process according to claim 12 wherein the step of welding the segment to the liner involves tack welding the segment to the liner at a plurality of locations along the periphery of the liner.

14. The process according to claim 13 and further comprising making a continuous final weld around the segment after the step of tack welding.

15. The process according to claim 14 wherein the step of establishing a seal comprises applying an adhesive-backed tape to the liner and the segment such that the tape bridges the gap that exists between the segment and the liner along the periphery of the segment.

16. The process according to claim 15 wherein the adhesive-backed tape is doubled back upon itself and adheres to the inside surface of the segment and to the outside surface of the liner.

* * * * *